Figure 1:
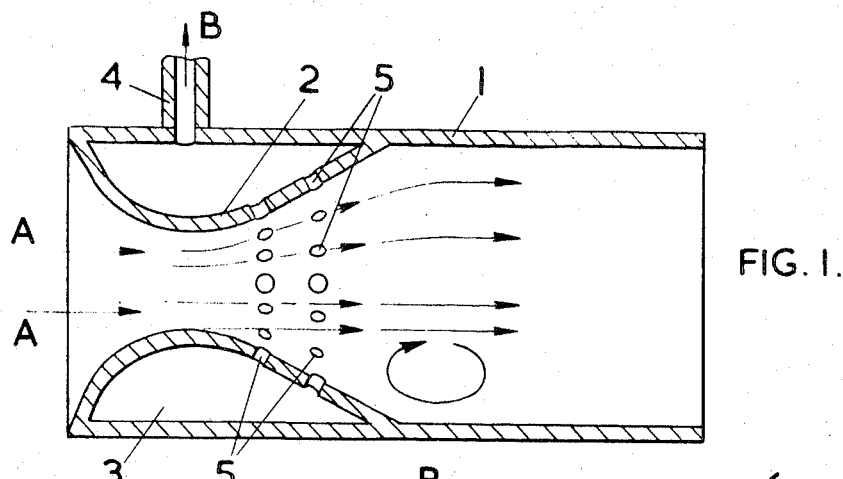

United States Patent
Jamieson

[15] 3,643,431
[45] Feb. 22, 1972

[54] FLOW CONTROL DEVICES

[72] Inventor: James Barry Jamieson, Fleet, England

[73] Assignee: Minister of Technology in Her Britannic Majesty's Government of the United Kingdom of Great Britain and Northern Ireland, London, England

[22] Filed: Dec. 4, 1969

[21] Appl. No.: 882,152

[30] Foreign Application Priority Data

Dec. 6, 1968 Great Britain....................58,178/68

[52] U.S. Cl..........................60/39.71, 60/39.23, 60/39.65, 137/81.5, 138/39, 138/45, 431/350
[51] Int. Cl. ...........................................F02c 3/00, F15d 1/06
[58] Field of Search ..............60/39.65, 39.23, 39.29, 39.69, 60/39.71; 137/81.5, 13.1, 13.2, 13; 415/168, 115, 116, 144, 108; 138/37, 39, 40, 44–46; 431/350–351, 352, 353; 261/64, 69, DIG. 69; 123/119, 119 C; 239/DIG. 3

[56] References Cited

UNITED STATES PATENTS

| | | | |
|---|---|---|---|
| 2,656,096 | 10/1953 | Schwarz | 415/115 |
| 2,788,719 | 4/1957 | Bennett | 138/37 |
| 2,841,182 | 7/1958 | Scala | 60/39.65 |
| 2,948,148 | 8/1960 | Anfreville | 137/81.5 |
| 3,123,285 | 3/1964 | Lee | 137/81.5 |
| 3,216,455 | 11/1965 | Cornell | 138/39 |
| 3,527,052 | 9/1970 | Bryce | 60/39.65 |

FOREIGN PATENTS OR APPLICATIONS

| | | | |
|---|---|---|---|
| 738,006 | 10/1955 | Great Britain | 60/39.65 |

Primary Examiner—Douglas Hart
Attorney—Cameron, Kerkam & Sutton

[57] ABSTRACT

In a venturi having a wide angle divergent section, flow separation can occur near the throat resulting in throttling. Suction is applied through perforations in the venturi surface to cause reattachment with consequent increase in flow rate. Air flowing to primary zones in combustion chambers can be controlled by selective application of suction so as to vary local air/fuel ratios according to operating conditions. A similar arrangement may be applied to fuel injector vaporizing tubes.

9 Claims, 7 Drawing Figures

PATENTED FEB 22 1972  3,643,431

SHEET 1 OF 3

FLOW CONTROL DEVICES

This invention relates to flow control devices, whereby variation in fluid flow is obtainable. Such devices may find application, for example, in gas turbine engines used for aircraft propulsion.

In conventional gas turbine engines, a compressor discharges air into a combustion system wherein fuel is introduced into the flow and burned, the combustion gases so produced being led to a turbine.

Generally, the compressor supplies more air than is necessary for complete combustion of the fuel and it is usual to divide the air flowing to the combustion system into two or more streams. One stream goes to initiate and support combustion, while another is used to dilute the hot combustion products to reduce their temperature to a value compatible with the working range of the turbine.

In gas turbine engines for aircraft, combustion systems are required to operate over a wide range of conditions which involve differing ratios in the mass flows of the combustion and dilution air streams. To ensure a high combustion efficiency, it is usual for the proportion of the total airflow supplied to the burning, or primary, zone to be determined by the amount of fuel required to be burned to produce the necessary heat input to the turbine at the cruise condition. Because of changes in the overall air/fuel ratio being reflected in the primary zone, an ideal air/fuel ratio at cruise usually leads to an overrich mixture in the primary zone at takeoff operating conditions with resultant soot formation and smoke emission. It is possible to reduce smoke emission at takeoff by weakening the primary zone mixture strength but this involves an increase in primary zone air velocity which makes ignition of the engine difficult to achieve at altitude. It is acknowledged as advantageous if a primary zone can be operated continuously at a substantially constant air/fuel ratio. Thus an uncomplicated reliable mechanism is desirable whereby air flowing to a primary zone can be varied according to operating requirements without substantial weight or performance penalties. In general, the severity of the environment discourages the use of mechanical devices involving moving parts. Since, as yet, no other practicable method has been found for achieving adequate control over the whole air mass flow without imposing too severe a penalty on the overall cycle performance, the expedient of partial control has received attention.

The present invention is concerned with flow control devices suitable for this purpose and involves the application of boundary layer control to the diffuser section of a venturi.

A flow control device according to the invention comprises a duct, a flow restrictor located within the duct and having a throat and a divergent portion downstream of the throat, and boundary layer control means associated with the restrictor.

In a preferred embodiment, the duct is substantially parallel-sided with the restrictor positioned at or near the inlet to the duct and means are provided for the application of suction to a surface of the restrictor.

Figure 2:
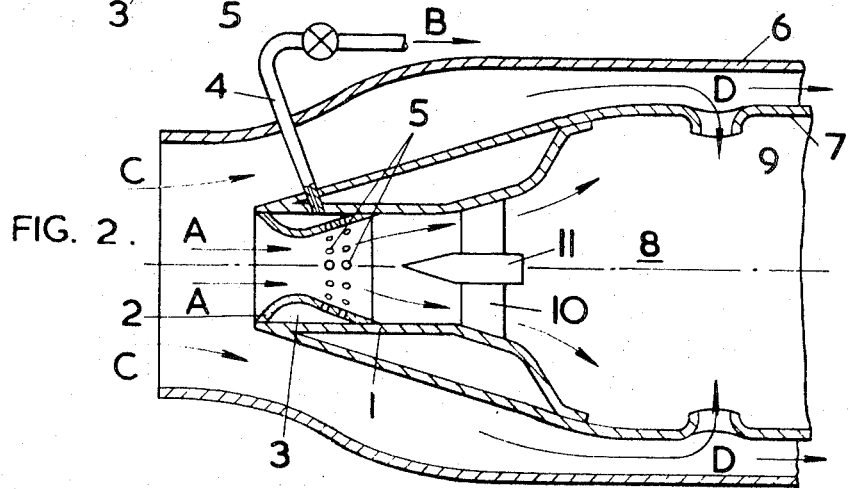
Figure 3:
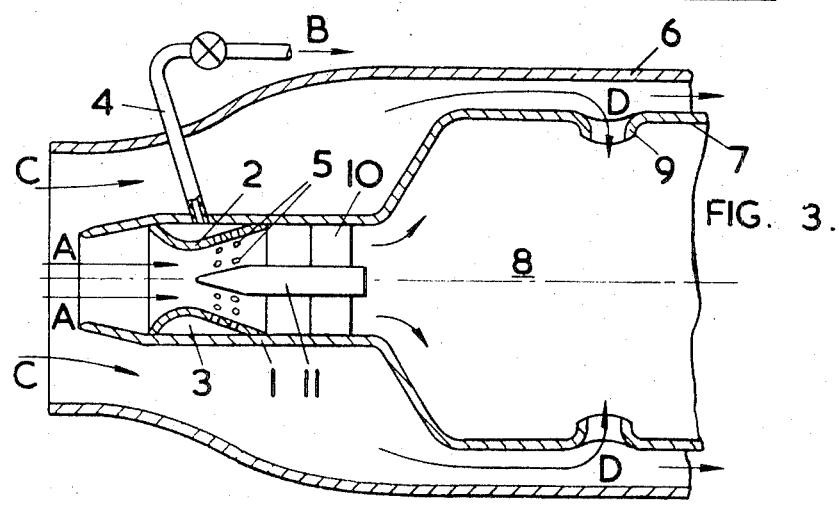
Figure 4:
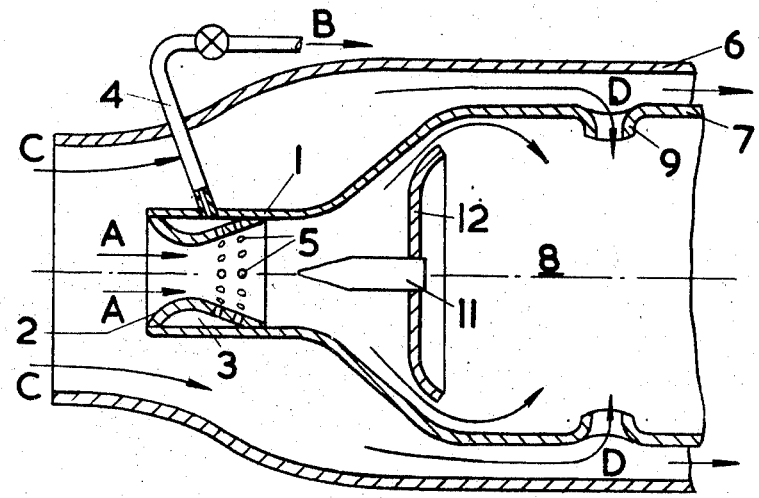
Figure 5:
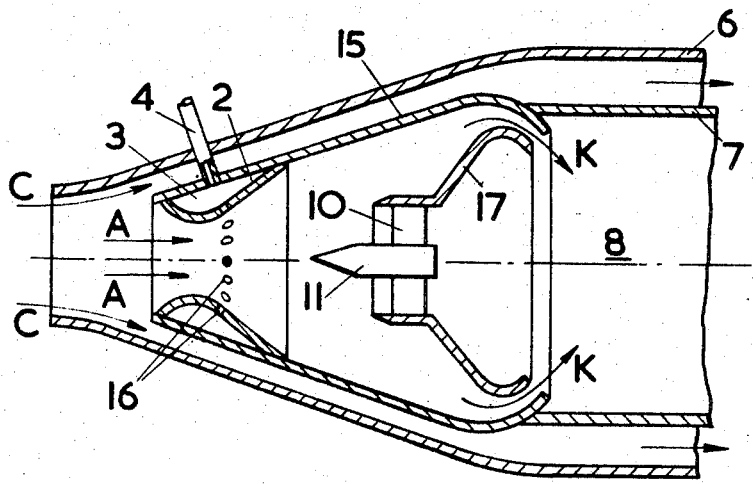
Figure 6:
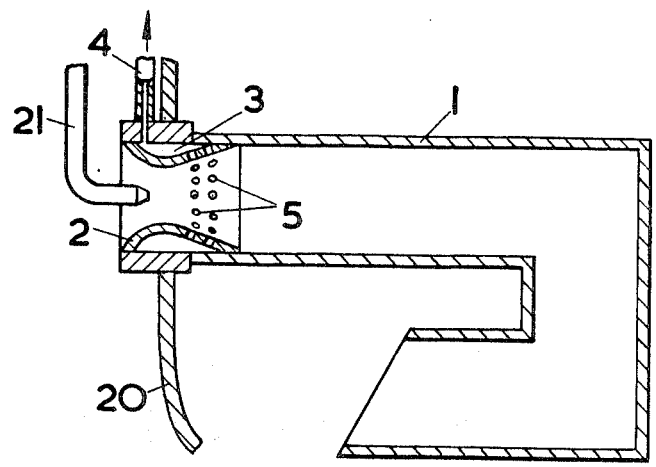
Figure 7:
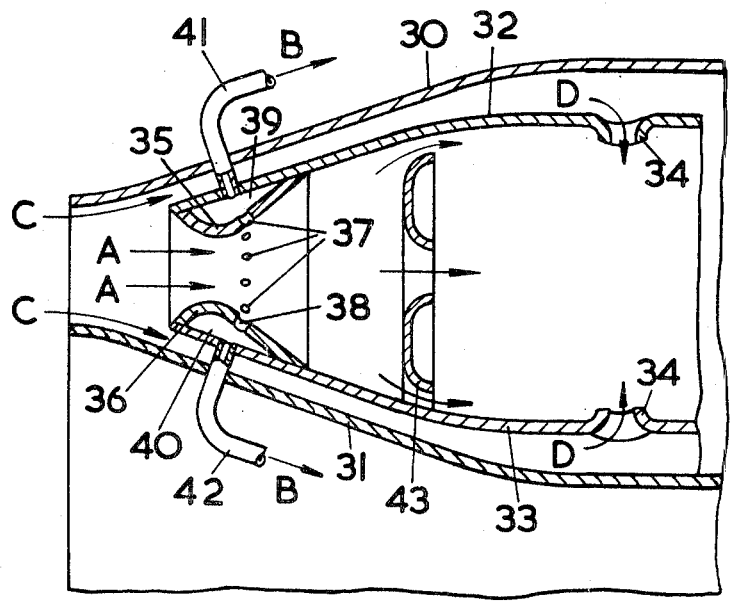

Various embodiments of the invention will now be described by way of example with reference to the accompanying drawings, of which:

FIG. 1 is an axial section through a flow control device,

FIGS. 2, 3 and 4 are partial axial sections through alternative tubular combustion chamber arrangements incorporating flow control devices, FIG. 5 is a similar view to those of FIGS. 2, 3 and 4 of another tubular combustion chamber arrangement incorporating a flow control device, FIG. 6 is an axial section through a vaporizing tube incorporating the flow control device of FIG. 1, and FIG. 7 is a partial axial section through an annular combustion chamber incorporating a flow control device.

Flow separation can occur in a venturi where the flow velocity is high, particularly if the angle of divergence downstream of the throat is large. It is known that the application of boundary layer suction to a wide divergent angle venturi in which flow separation has occurred will secure reattachment of flow with an associated rise in efficiency. With a particular venturi it has been shown that efficiency can be raised from 50 to 81 percent with a boundary layer flow equal to 5 percent of the total throughflow.

The exit plane discharge coefficient approximates to the ratio between the respective areas of the throat and the exit plane when separation occurs at the throat but will be increased considerably by the application of suction to secure reattachment of flow. For example, a venturi having a 3/1 area ratio between the exit plane and the throat and a 10° angle of divergence, showed a discharge coefficient of 0.63 at the exit plane with normal flow but this became only 0.33 when flow separation occurred at the throat. A venturi can therefore be made to act as a flow control device. Further improvement may be obtained by the addition of a parallel duct to the downstream end of the divergent portion by which further pressure recovery is achieved due to velocity redistribution.

FIG. 1 shows a flow control device comprising a cylindrical duct 1 with an annular restrictor 2 therein at one end. The restrictor tapers inwardly from each end to define a venturi having its throat located axially part way along the restrictor, the cross-sectional area of the throat being of the order of one-third of that of the duct. The normal direction of airflow through the duct is indicated by the arrows A, the restrictor thus being situated at the inlet end of the duct with a convergent portion upstream of the throat of the venturi and a divergent portion downstream of it. An annular space 3 is defined between the restrictor and the wall of the duct and communicates with a passage 4 extending through the wall. Holes 5 extend through the restrictor in the divergent portion of the venturi and are arranged in two axially spaced circumferentially extending rows. The included angle of the divergent portion of the venturi is approximately 60° which will result in separation of flow at or near the throat even when air is passing into the duct at low velocity. This condition is shown in the lower part of the figure and will result in "throttling" of the flow with maximum exit velocities near the axis of the duct and a sharp reduction in velocity profiles radially to substantially zero at the duct walls. Suction applied to the passage 4, as indicated by the arrow B, will be communicated to the annular space 3 to act through the holes 5 on the flow boundary layer which will thus be reduced in thickness causing the separation point to move downstream with consequent reattachment of flow within the duct, as shown in the upper part of the figure. The resultant velocity profile at the outlet becomes less steep with a reduction in maximum velocity and an appreciable velocity maintained at the duct wall. Flow through the duct is thus increased—it has been found that the discharge coefficient can be increased by a factor of 1.7 for a suction flow through the passage 4 or 2 percent of the total throughput.

It is envisaged that proportional control can be obtained by such means as varying the amount of suction or by connecting different rows of holes separately to a source of suction through a differential valve arrangement. Furthermore, although the venturi has been shown as of convergent-divergent form, the convergent section is not essential and can be replaced, for instance by a small radius or other entry whereby the formation of a vena contracta is prevented.

FIGS. 2, 3 and 4 show the application of flow control devices substantially as previously described to tubular combustion chambers as used in gas turbine engines, the same reference numerals being used in each case to indicate corresponding integers. All the arrangements are basically similar, air entering a combustion chamber 6 at its upstream end as indicated by the arrows C and being divided into two streams, one of which passes to an annular space surrounding a flame tube 7 which is mounted coaxially within the combustion chamber, and the upstream indicated by the arrows A, passing into the duct 1 from which it is directed into the primary zone 8 of the flame tube. The duct 1 in each case is provided with a restrictor 2 near its upstream end which defines a venturi having holes 5 extending through its divergent portion communicating with an annular space 3 surrounding the venturi and connected by a passage 4 to a source of suction. Part of the airstream directed to the annular space which surrounds the flame tube passes through holes 9 in the flame tube as indicated by the arrows D as secondary combustion air, the remainder flowing to dilution holes (not shown) in the flame tube further downstream. Application of suction to the annular space 3 will act as previously described to secure reattachment of separated flow and increase total flow through the duct.

In the arrangements of FIGS. 2 and 3, air passing through the duct 1 flows through a swirler 10 surrounding a fuel injector 11 before entering the primary zone 8. In FIG. 2, the flow control device might be said to be in series with the fuel injector, while in FIG. 3 it is coaxial with it. In either case, it could be convenient to extend the fuel injector body through the venturi in a downstream direction relative to normal flow through the duct so that it forms a centerbody.

In the arrangement of FIG. 4 the air passing through the duct 1 is diverted by baffles 12 to enter the primary zone through slots disposed about the fuel injector 11.

FIG. 7 shows in effect the arrangement of FIG. 4 as applied to an annular combustion chamber. The chamber is defined by two concentric circumferential walls 30,31 and encloses a flame tube also defined by two concentric circumferential walls 32,33. As before, an airflow C enters the combustion chamber at its upstream end and is divided, one stream A being directed into the flame tube and another stream flowing round the outside of the flame tube, some of the latter stream passing through holes 34 in the flame tube as secondary combustion air. The entry to the flame tube is provided with a restrictor in the form of annular rings 35,36 of curved profile attached to the inner faces, relative to the flame tube, of the walls 32,33 in the region of the upstream end of the flame tube. In a two-dimensional sense (i.e. in section as seen in FIG. 7), the rings form a venturi through which air passing to the primary combustion zone of the flame tube must flow. Circumferential rows of holes 37,38 extend through the annular rings 35,36 in the divergent portion of the venturi just described connecting the flow passage with spaces 39,40 enclosed between the ring 35 and wall 32 and the ring 36 and the wall 33 respectively. Pipes 41,42 connect the spaces 39,40 to a suitable source of suction and a baffle 43 is provided to distribute incoming air evenly in the primary combustion zone. Operation is as already described by the application of suction to secure reattachment of separated flow (over the surfaces of the rings 35,36 in this case).

The air flowing directly to the primary combustion zone in this case is typically 10 to 15 percent of the total chamber mass flow so that a suction flow of 5 percent would constitute only 0.5 to 0.75 percent of the total air.

In a gas turbine engine, air is normally at its maximum pressure at the inlet to a combustion chamber and thus suction may be readily obtained by a vent extending from this region to some other part of the engine where lower pressure necessarily obtains.

FIG. 5 shows an arrangement where both primary and secondary air pass through a flow control device, the same reference numerals being used as in FIGS. 1–4. Air entering a tubular-type combustion chamber is divided into two streams as heretofore, one stream passing to an annular space around the flame tube 7 but then flowing direct to dilution holes. The other stream passes to a divergent duct 15 having a flow restrictor 2 at its inlet end, the flow restrictor defining a venturi and annular passage 3 as previously and having a similar passage 4 for connection to a source of suction. A row of holes 16 is provided for boundary layer control purposes and part of the air flowing through the duct 15 passes through a swirler 10 surrounding a fuel injector 11 to the primary zone 8. A baffle 17 cooperates with the outer wall of the duct 15 to define nozzles through which the remainder of the air flowing through the duct is discharged as secondary combustion air as indicated by the arrows K. By the use of this arrangement it is possible to control a larger percentage of the airflow passing to the primary zone.

As indicated earlier, high performance combustion systems for aircraft gas turbine engines are designed so that the overall flow division is a compromise between the conflicting requirements of reasonable primary zone air velocities for altitude reignition and acceptable primary zone ratios at takeoff. Improvements in the altitude performance by reducing the primary airflow is reflected in even richer primary zone operation at takeoff and altitude engine acceleration conditions. By the use of a flow control device as described the division of airflow can be adjusted by applying suction during takeoff and acceleration conditions to permit an increased flow of air to the primary zone and thus weaken an overrich mixture which would otherwise obtain there. Suction would not be applied during relight, cruise and standoff and the primary mass flow would therefore be less; since no suction flow is required during cruise operation there will be no performance penalty on this account during this particular phase of operation when specific fuel consumption is an important consideration.

Some combustion systems employ vaporizing tubes to which fuel and air are introduced externally of a combustion chamber and pass via the tube to the combustion zone. The tube itself is largely located within the flame tube and is thus subjected to hot gases with the result that the air/fuel mixture is vaporized before entering the combustion zone. Difficulties are sometimes experienced with this arrangement during transient conditions particularly with weak mixtures. FIG. 6 shows the application of a flow control device to a vaporizing tube, the essential components being as already described and indicated by the same reference numerals. In this case the duct 1 with a flow restrictor 2 at its inlet end extends through a flame tube wall 20 and is extended at its downstream end through two right angle bends to discharge within the flame tube. Fuel is discharged from an injector nozzle 21 which is directed at the inlet of the duct 1. Air/fuel ratio varies according to the airflow through the duct, the application of suction on the flow boundary layer through the holes 5, causing an increased volume of air to flow through the duct for the same amount of fuel, thus weakening the mixture. Conversely, reduction of suction produces a richer mixture. An incidental benefit arises from the injection of fuel just upstream of the throat of the flow restrictor due to increased throat velocity when there will be a resultant increase in the degree of atomization of fuel prior to vaporization taking place.

In some cases it will be advantageous if suction is not employed for flow control purposes. This can be achieved by the use of a flow restrictor in which separation will not normally occur and inducing separation by the discharge of gas streams from orifices in the surface of the restrictor downstream of its throat. The gas could be air tapped from the region of the duct inlet since it need be at only a slightly greater pressure than that obtaining at the throat. In a gas turbine engine, the use of such an arrangement to control airflow to a primary combustion zone, for instance, need incur no performance penalty during cruise operation but an increase in overall duct length is probably necessary to ensure maximum pressure recovery.

I claim:

1. Combustion apparatus comprising a combustion chamber and a fuel vaporizing tube defined by an air inlet to the combustion chamber, in which the air inlet incorporates a flow control device comprising a duct, a flow restrictor located within the duct and having a throat and a divergent portion extending downstream from the throat relative to the direction of airflow through the duct, and boundary layer control means associated with the restrictor.

2. Combustion apparatus according to claim 1 further comprising a fuel injector arranged to discharge fuel through the restrictor in a downstream direction relative to the direction of airflow.

3. Combustion apparatus according to claim 2 in which the injector is arranged to discharge fuel immediately upstream of the throat.

4. Combustion apparatus according to claim 1 in which the boundary layer control means is arranged to be selectively applied to flow passing over a surface of the restrictor.

5. Combustion apparatus according to claim 1 in which the duct is substantially parallel sided.

6. Combustion apparatus according to claim 1 in which holes extend through the surface of the divergent portion of the restrictor and the holes are connected to a source of suction.

7. Combustion apparatus according to claim 6 in which the restrictor is a venturi.

8. Combustion apparatus according to claim 1 in which the cross-sectional area of the throat of the restrictor is substantially one-third of the cross-sectional area of the duct at the exit plane of the restrictor.

9. Combustion apparatus according to claim 1 in which the included angle of the divergent portion of the restrictor is substantially 60°.

* * * * *